United States Patent
Baumann

(10) Patent No.: US 6,935,784 B2
(45) Date of Patent: Aug. 30, 2005

(54) SLIDE SYSTEM

(75) Inventor: Ulrich Baumann, Lenningen (DE)

(73) Assignee: Traub Drehmaschinen GmbH, Reichenbach (DE)

( * ) Notice: Subject to any disclaimer, the term of this patent is extended or adjusted under 35 U.S.C. 154(b) by 62 days.

(21) Appl. No.: 10/388,212

(22) Filed: Mar. 13, 2003

(65) Prior Publication Data

US 2003/0198410 A1 Oct. 23, 2003

(30) Foreign Application Priority Data

Mar. 15, 2002 (DE) .......................... 102 12 343

(51) Int. Cl.[7] .............................. F16C 29/10
(52) U.S. Cl. ........................... 384/41; 384/42
(58) Field of Search ............... 384/42, 41, 40, 384/39, 26

(56) References Cited

U.S. PATENT DOCUMENTS 3,832,019 A * 8/1974 Alessi .......................... 384/40
5,704,716 A * 1/1998 Jantunen ...................... 384/42

FOREIGN PATENT DOCUMENTS

| DE | 410022 | 2/1925 |
|----|--------|--------|
| DE | 198 12 926 | 9/1999 |
| DE | 199 34 754 | 5/2001 |

* cited by examiner

Primary Examiner—Lenard A. Footland
(74) Attorney, Agent, or Firm—Lipsitz & McAllister, LLC

(57) ABSTRACT

A slide system for machine tools is provided, comprising a base member, at least one guide rail held on the base member and extending in a longitudinal direction, and a slide on the guide rail with at least one guide carriage. The guide rail has a guiding area and a base area. One of the base area or the base member has a receiving means extending transversely to the longitudinal direction of the guide rail and the other of the base area or the base member has an insert member insertable into the receiving means in a direction transverse to the longitudinal direction of the guide rail. A clamping element is provided for clamping the insert member in the receiving means. The insert member is fixed in a form-locking manner by the receiving means and the clamping element in all directions extending transversely to the longitudinal direction.

35 Claims, 3 Drawing Sheets

SLIDE SYSTEM

The present disclosure relates to the subject matter disclosed in German application No. 102 12 343.8 of Mar. 15, 2002, which is incorporated herein by reference in its entirety and for all purposes.

BACKGROUND OF THE INVENTION

The invention relates to a slide system for machine tools, comprising a base member, at least one guide rail which is held on the base member and extends in a longitudinal direction, and a slide guided on the guide rail with at least one guide carriage.

In the case of the known slide systems, the guide rails themselves are screwed to the base member by means of screws, which pass directly through the guide rail over its entire height. Therefore, the guide rails are connected to the base member only by means of the screws. The fact that the guide rails are screwed to the base member makes it difficult to fix the guide rail exactly relative to the base member such that the longitudinal direction of the guide rail follows the desired direction with a precision in the micrometer range.

The object underlying the invention is, therefore, to improve a slide system of the generic type in such a manner that the guide rails can be mounted with as great a precision as possible and as easily as possible.

SUMMARY OF THE INVENTION

This object is accomplished in accordance with the invention, in a slide system of the type described at the outset. The slide system comprises a base member, at least one guide rail which is held on the base member and extends in a longitudinal direction, and a slide guided on the guide rail with at least one guide carriage. The guide rail has a guiding area for guiding the slide and a base area for providing a fixed connection to the base member. One of the base area and the base member has a receiving means extending transversely to the longitudinal direction of the guide rail. The other of the base area and the base member has an insert member insertable into the receiving means. This insert member being inserted into the receiving means in a direction transverse to the longitudinal direction of the guide rail. A clamping element is provided for clamping the insert member in the receiving means such that the insert member is fixed in a form-locking manner by the receiving means and the clamping element in all directions extending transversely to the longitudinal direction.

The advantage of the inventive solution is to be seen in the fact that the alignment of the longitudinal direction of the guide rail can be predetermined in a simple manner as a result of the provision of the receiving means and the insert member. In addition, a stable and precise fixing of the guide rail in all directions extending transversely to the longitudinal direction is possible as a result of the receiving means, the clamping element and the insert member.

An additional advantage of the present invention is to be seen in the fact that it is possible to replace the guide rail in a simple manner by employing a clamping element with a releasable design.

It is particularly favorable for the precise alignment of the guide rail when the receiving means has at least one aligning surface, on which an associated mounting surface of the insert member abuts.

In an example embodiment of the invention, the receiving means may have two aligning surfaces, on each of which an associated mounting surface of the insert member abuts.

The aligning surfaces in the receiving means may be arranged relative to one another as required. A particularly favorable solution does, however, provide for the two aligning surfaces to be arranged in the receiving means so as to face one another.

In order to achieve a precise alignment of the insert member during its insertion into the receiving means, it is preferably provided for the aligning surface and the associated mounting surface of the insert member to form a pair of surfaces. At least one surface of the pair of surfaces may comprise a flat surface.

An additional improvement in the precision of the alignment may be achieved in that each aligning surface and the associated mounting surface of the insert member form a pair of surfaces and that at least one surface of each pair of surfaces comprises a flat surface.

A particularly great degree of precision of the alignment, as well as a permanent stability may be achieved when both surfaces of a pair of surfaces comprise flat surfaces and thus abut on one another areally.

Alternatively to providing flat surfaces, it is also conceivable to use slightly curved surfaces. Surfaces of this type are more complicated to produce. However, by taking into consideration any deformations occurring due to the effect of any force beforehand by means of the curvature the desired surface shape (e.g., a flat surface) is then present when the force occurs.

With respect to the alignment of the surfaces of different pairs of surfaces relative to one another, no further details have so far been given.

It would, for example, be conceivable to arrange the surfaces of different pairs of surfaces at an obtuse angle relative to one another.

A particularly favorable solution does, however, provide for the surfaces of different pairs of surfaces to extend at an angle of less than 90° relative to one another.

In order to achieve a close-fit abutment of the surfaces on one another, it is preferably provided for the angles between the surfaces of different pairs of surfaces to be greater than the critical angle of a self-locking of the surfaces so that, during the insertion of the insert member into the receiving means, the surfaces come to rest on one another without any hindrance due to self-locking.

It is particularly favorable when the flat surfaces of the different pairs of surfaces extend at an angle in the range of between 30° and 60° relative to one another.

In order for the end position of the guide rail to be reached precisely during the insertion of the insert member into the receiving means, it is preferably provided for the pairs of surfaces to be formed by surfaces sliding relative to one another.

It is particularly favorable when the pairs of surfaces are each formed by ground surfaces.

With respect to the design of the base area itself, no further details have been given in conjunction with the preceding explanations concerning the individual embodiments. One solution, which is advantageous for as stable a fixing as possible of the guide rail, provides for the base area to be designed so as to be symmetric to a longitudinal central plane of the guide rail.

Preferably, the guiding area is likewise designed to be symmetric to the longitudinal central plane of the guide rail.

Such a guide rail may be produced particularly favorably when the base area and the guiding area of the guide rail are part of an integral profiled rail extending in the longitudinal direction.

The profiled rail may have varying cross-sectional shapes.

A particularly favorable production is possible when the profiled rail has an essentially constant cross-sectional shape in the longitudinal direction.

A particularly advantageous embodiment of the inventive solution provides for the clamping element to act constantly on the insert member with a clamping force so that the insert member is, altogether, constantly clamped by means of clamping forces.

In principle, it would be conceivable to clamp the insert member of the guide rail at several individual locations. The inventive solution is, however, particularly advantageous when at least one clamping element acts on the insert member with the clamping force at multiple locations over the length of the guide rail.

In this respect, it is preferably provided for the multiple action of the clamping force to lead to the areas extending in the longitudinal direction of the guide rail, in which the clamping force acts, so that the areas in which the clamping force acts have in total a greater extension than the areas in which no clamping force acts.

It is particularly favorable, in order to obtain a precise alignment of the guide rail, when the clamping forces acting on the insert member with the clamping element are adjustable.

As a result, it is possible to adjust and also readjust the clamping force from outside the guide rail. Furthermore, the clamping force can be adjusted and readjusted in the same way when the guide rail is replaced.

In this respect, the clamping elements themselves are preferably designed to be adjustable in their effect. For example, the clamping elements may be adjustable relative to the base member in order to act on the insert member with an adjustable clamping force.

It is, in fact, even more favorable when the clamping force can be adjusted locally.

In principle, it would also be conceivable for the clamping element or elements to penetrate the guide rails or parts of the guide rails.

It is, however, particularly favorable, especially with a view to an economical manufacture of the guide rails, when the clamping element or the clamping elements are arranged without penetrating the guide rail.

A particularly expedient arrangement of clamping element and insert member provides for the clamping element to act on the insert member from a side located opposite the receiving means.

With respect to the design of the clamping element, no further details have so far been given. The clamping element could, for example, be operative between the base member and the guide rail, acting only indirectly on the insert member or the receiving means.

A particularly favorable solution does, however, provide for the clamping element to act directly on the insert member and, therefore, bring about as precise a fixing as possible of the insert member.

In order to be able to introduce the clamping force via the clamping element as uniformly as possible, it is preferably provided for the clamping element to abut areally on the insert member.

Furthermore, a plurality of clamping elements may, as discussed above, be operative when viewed over the length of the guide rail. A particularly favorable solution provides for the clamping element to be designed as a clamping bar which extends essentially over the length of the guide rail. With this solution, as uniform an introduction of force as possible can be realized by means of the clamping element.

The inventive clamping element expediently acts on the part to be acted upon (e.g., the insert member) by means of at least one pressure surface. Several pressure surfaces which are operative at the same time may be provided on the clamping element. It is, however, particularly favorable when one pressure surface extends over the extension of the clamping element in its longitudinal direction.

One particularly favorable embodiment of a clamping element for the inventive solution provides for the clamping element to be provided with pressure surfaces on oppositely located longitudinal sides for acting on respective insert members.

In this respect, it is particularly favorable when the pressure surfaces of a single clamping element act upon insert members of different, adjacent guide rails so that two guide rails can be fixed in the corresponding receiving means by a single clamping element.

With respect to the design of the insert member and the receiving means on the base member and the guide rail, no further details have so far been given.

One possibility is to provide the base member with an insert member which engages in a receiving means provided in the base area of the guide rail.

One particularly advantageous solution provides for the base area of the guide rail to be designed as an insert member and for the base member to have the receiving means. As a result, a suitable connection between the base member and the guide rail can be realized in a particularly simple manner.

A particularly expedient design of a base area of a guide rail representing an insert member provides for the base area to have at least three mounting surfaces which extend parallel to the longitudinal direction of the guide rail. Each of the mounting surfaces extends in a direction transverse to the longitudinal direction and parallel to a different, respective side of a triangle located in a plane extending transversely to the longitudinal direction.

The inventive solution may be realized in a particularly favorable manner with mounting surfaces of this type which are arranged along the sides of a triangle.

In this respect, the mounting surfaces are preferably arranged such that one of the mounting surfaces extends on a side of the base area located opposite the guiding area.

Furthermore, the other two of the three mounting surfaces are arranged on the base area such that they extend on different sides of the mounting surface that is located opposite the guiding area.

In this respect, one particularly favorable solution provides for the triangle defining the position of the mounting surfaces transversely to the longitudinal direction to be an isosceles triangle.

Additional features and advantages of the inventive solution are the subject description as well as the drawings illustrating one embodiments.

DETAILED DESCRIPTION OF THE INVENTION

Figure 1:
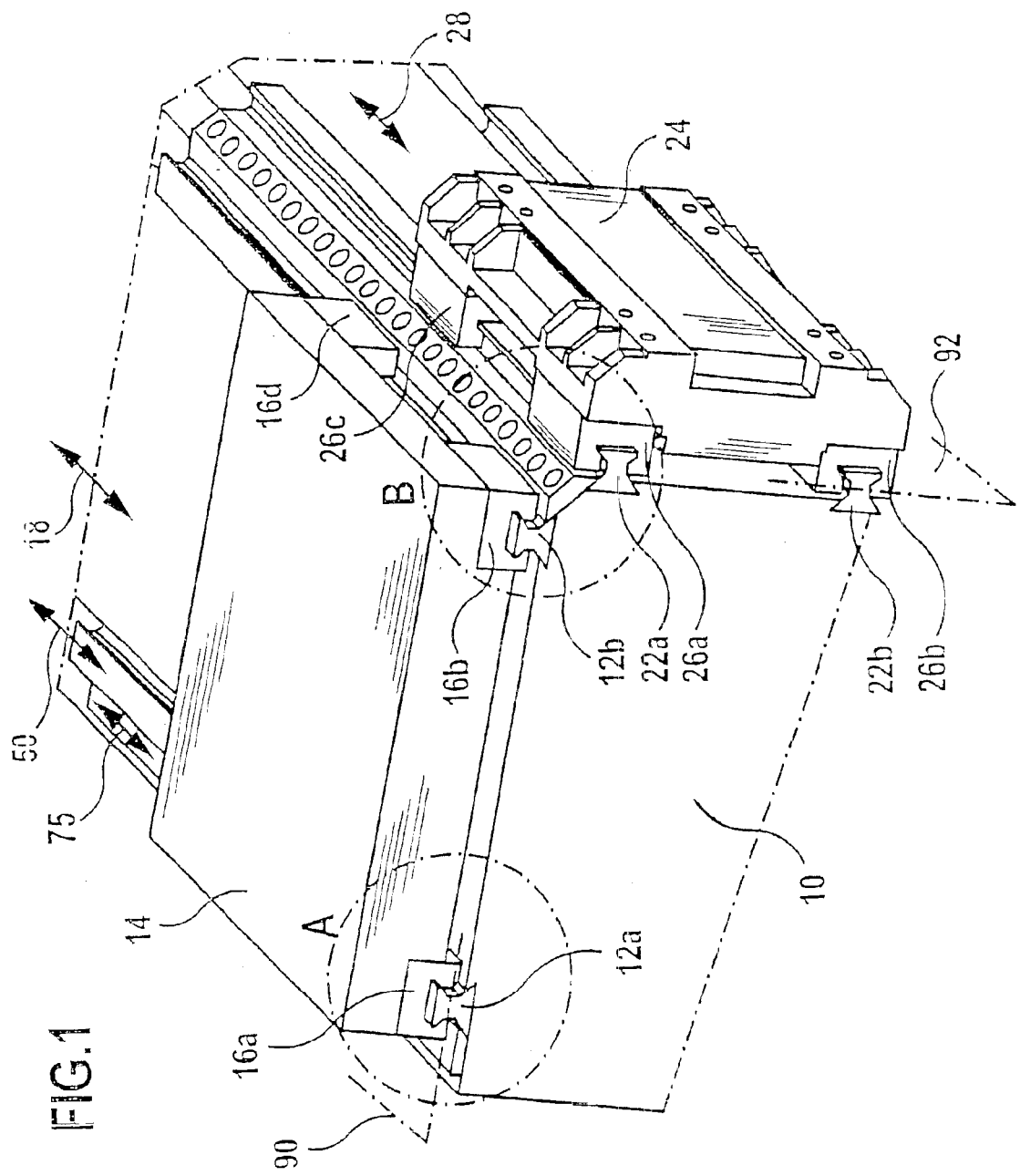
FIG. 1 shows a perspective illustration of a first embodiment of an inventive slide system with two slides.

One embodiment of an inventive slide system illustrated in FIG. 1 comprises a base member 10, on which two guide rails 12a and 12b are, for example, provided for a first slide 14. The first slide 14 is provided with guide carriages 16a, 16b and 16d which are guided on the guide rails 12a and 12b in a direction of guidance 18 while the guide carriages 16a, 16b and 16d are securely connected to the slide 14.

In the same way, guide rails 22a and 22b are provided on the base member 10 for a second slide which is designated as a whole as 24. The second slide 24 is provided with guide carriages 26a, 26b and 26c which are likewise guided on the guide rails 22a and 22b in the direction of guidance 28. Guide carriages 26a, 26b and 26c and are securely connected to the second slide 24.

Figure 2:
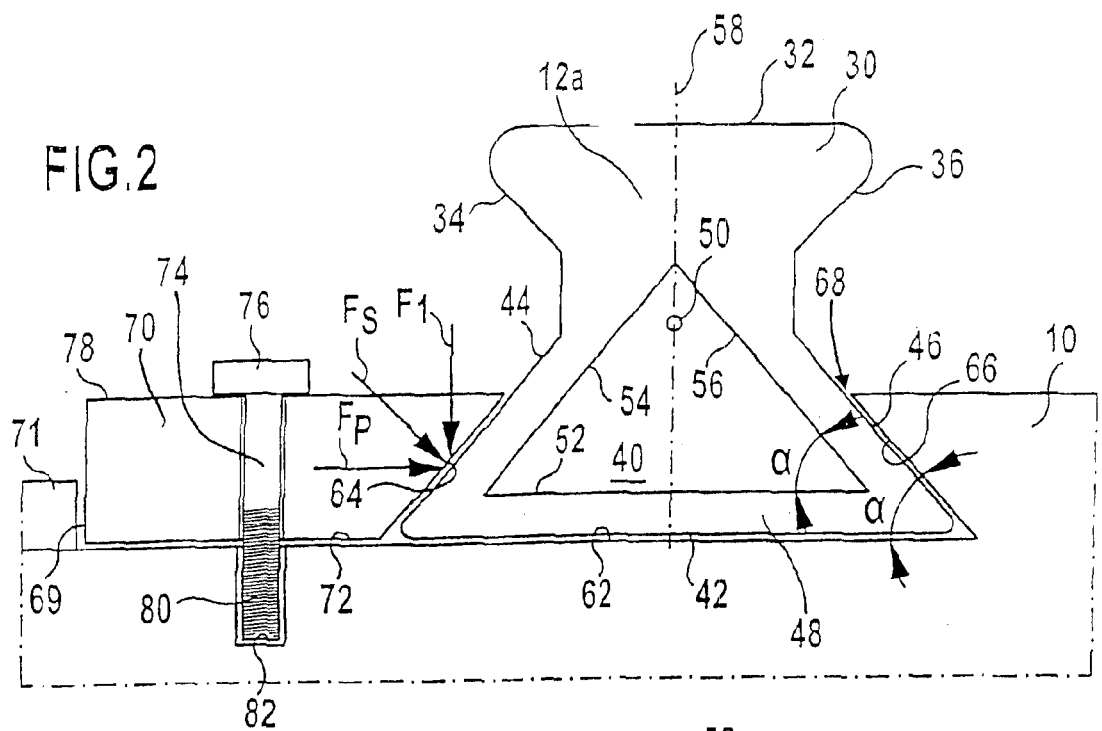
FIG. 2 shows an enlarged illustration of the area A in FIG. 1.

As illustrated in FIG. 2 with the example of the guide rail 12a, each of the guide rails has a guiding area 30 with guiding surfaces 32, 34 and 36 as well as a base area 40 which has mounting surfaces 42, 44 and 46. The base area 40 represents an insert member 48 in the first embodiment. In this embodiment, mounting surfaces 42, 44, 46 extend in longitudinal direction 50 of the respective guide rail, for example, the guide rail 12a. The mounting surfaces 42, 44, and 46 also extend transversely to the longitudinal direction 50 parallel to the sides 52, 54 and 56 of an isosceles triangle. The triangle is located in a cross-sectional plane extending at right angles to the longitudinal direction 50 and coinciding with the plane of drawing in FIG. 2 and, in addition, is arranged so as to be symmetric to a longitudinal central plane 58 extending through the longitudinal direction 50.

The sides of the triangle 52, 54 and 56 may, in principle, extend as required and merely represent mathematical auxiliary lines which define the alignment of the mounting surfaces 42, 44 and 46.

In the embodiment illustrated in FIG. 2, the guide rail 12a is supported with the mounting surface 42 located on the other side from the guiding area 30 on a countersurface on the base member 10 acting as an aligning surface 62.

At least one of the additional mounting surfaces 44 and 46 of the base area 40, for example, the mounting surface 46 faces an additional countersurface 66 which is arranged on the base member 10 and, in this case, acts as an aligning surface. The aligning surface 66 extends in this embodiment at an acute angle α in relation to the aligning surface 62.

As a result, the two aligning surfaces 62, 66 form a receiving means 68 for the base area 40 of the guide rail 12a designed as an insert member 48.

The mounting surfaces 42, 44 and 46 of the guide rail 12a preferably extend essentially over the entire length of the guide rail 12a.

The guide rail 12a can be aligned exactly relative to the base member 10 since the mounting surface 42 abuts on the aligning surface 62 and the mounting surface 46 abuts on the aligning surface 66. Therefore, the course of the guide rail 12a relative to the base member 10 can be predetermined by the provision of the aligning surfaces 62, 66, for example, by means of a precise metal cutting.

In order to obtain a stable and defined alignment of the guide rail 12a relative to the base member 10, the additional mounting surface 44, which does not abut either on the aligning surface 62 or on the aligning surface 66, is acted upon by a pressure surface 64 of a clamping element designated as a whole as 70. The pressure surface 64 of the clamping element 70 is preferably aligned parallel to the mounting surface 44 and acts on the mounting surface 44 with a clamping force F1. Clamping force F1 acts at right angles to the mounting surface 44 and may be separated into a force component FP and a force component FS. The force component FP extends parallel to the aligning surface 62 and displaces and acts on the guide rail 12a in the direction of the aligning surface 66. The force component FS extends at right angles to the aligning surface 62 and, therefore, presses the mounting surface 42 against the aligning surface 62.

In order to be able to act with the clamping force F1, the clamping element 70 is preferably supported on its rear side 69 located opposite the pressure surface 64 by a supporting element 71 projecting from the base member 10.

The aligning surface 66 extends, in the same way as the pressure surface 64, at the angle α in relation to the aligning surface 62 and the pressure surface 64 is arranged so as to face the aligning surface 66. Therefore, the same force components FP and FS as those at the pressure surface 64 result as reaction forces at the aligning surface 66 and act on the mounting surface 46 in the same way as the force components FP and FS act on mounting surface 44. Accordingly, the base area 40 of the guide rail 12a is acted upon with the clamping force FS in the direction of the aligning surface 62. The base area 40 is also held clamped between the pressure surface 64 and the aligning surface 66 against any movement in the direction of the aligning surface 62 on account of the force component FP occurring at each of these surfaces.

In order to ensure that the same force components FP and FS as those at the pressure surface 64 occur at the aligning surface 66, the mounting surface 42 is designed as a polished surface and rests slidingly on the aligning surface 62. The aligning surface 62 is likewise designed as a polished surface. Similarly, the mounting surface 46 is also designed as a polished surface and rests slidingly on the aligning surface 66, which is likewise of a polished design.

Preferably, the mounting surface 44 and the pressure surface 64 are also designed as ground surfaces.

As a result, the guide rail 12a can, when the mounting surface 44 is acted upon by means of the clamping element 70, be moved transversely to the longitudinal direction 50 in such a manner that the same forces occur in the area of the aligning surface 66 as in the area of the pressure surface 64.

In order to cause the pressure surface 64 to act with pressure on the mounting surface 44, the clamping element 70 is movable in the direction of a base surface 72. The base surface 72 preferably extends parallel to the aligning surface 62 and, in the most favorable case, is located in a plane with the aligning surface 62.

In the simplest case, the clamping element 70 is movable in the direction of the base surface 72 by a screw 74. The screw 74 rests with its head 76 on a side 78 of the clamping element 70 facing away from the base surface 72 and passes through the clamping element 70. The screw 74 can be screwed with a threaded section 80 into a threaded bore 82 which extends into the base member 10 proceeding from the base surface 72.

As a result, the entire clamping element 70 may be acted upon with force in the direction of the base surface 72 and therefore acts with the pressure surface 64 against the mounting surface 44.

It is, for example, conceivable to provide a plurality of consecutive clamping elements 70 in longitudinal direction 50 of the guide rail 12a. It is, however, particularly favorable when the clamping element 70 is designed as a continuous bar which can be tensioned in the direction of the base member 10 by screws 74 which are arranged at suitable, in the simplest case, regular intervals in the longitudinal direction 75 of the continuous bar parallel to the longitudinal direction 50 of the guide rail 12a. With such an arrangement, it is possible to generate with the pressure surface 64 a force F1 which can have variations at different screw locations. In one variation of the solution, the forces F1 at the different screw locations varies at the most by 20% when seen in the direction of the longitudinal direction 50 of the guide rail 12a. Preferably the force F1 has approximately the same magnitude essentially over the length of the guide rail 12a.

As illustrated in FIG. 1, the guide rails 12a and 12b may be located in a first plane of guidance 90 and the guide rails 22a and 22b may be located in a second plane of guidance 92 such that the planes of guidance 90 and 92 extend transversely to one another. As illustrated on an enlarged scale in FIG. 3, such an arrangement may be used particularly advantageously and particularly favorably in the case of the guide rails 12b and 22a located closest to a line of intersection 94 of the planes of guidance 90 and 92 such that the receiving means 68 may be arranged on the base member 10 with the aligning surfaces 66 on sides facing respectively away from the line of intersection 94. The aligning surfaces 62 may extend approximately parallel to the respective planes of guidance 90, 92. The mounting surfaces 44, which are intended to each be acted upon by a pressure surface 64, may be located so as to face the line of intersection 94.

Figure 3:
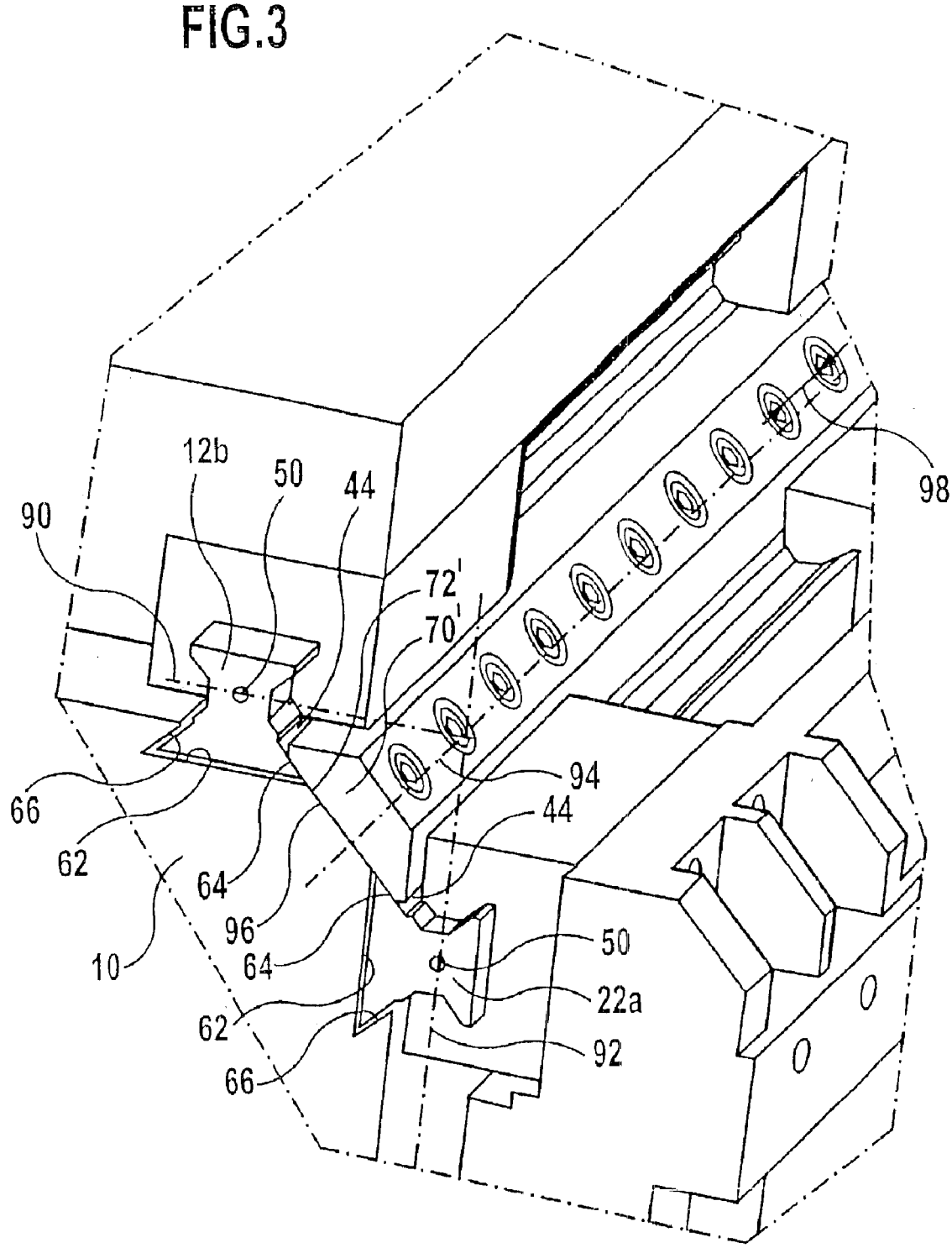
FIG. 3 shows an enlarged illustration of the area B in FIG. 1.

As a result, as shown in FIG. 3, the pressure surface 64 for the guide rail 12b and the pressure surface 64 for the guide rail 22a may be arranged on a common clamping element 70'.

In this respect, the pressure surfaces 64 are preferably located on either side of an underside 96 of the clamping element 70' which faces a base surface 72' on the base member 10 provided for the clamping element 70'. The pressure surfaces 64 are acted upon in the direction of the base surface 72' by screws 74 following one another in a longitudinal direction 98 of the clamping element 70'.

Figure 4:
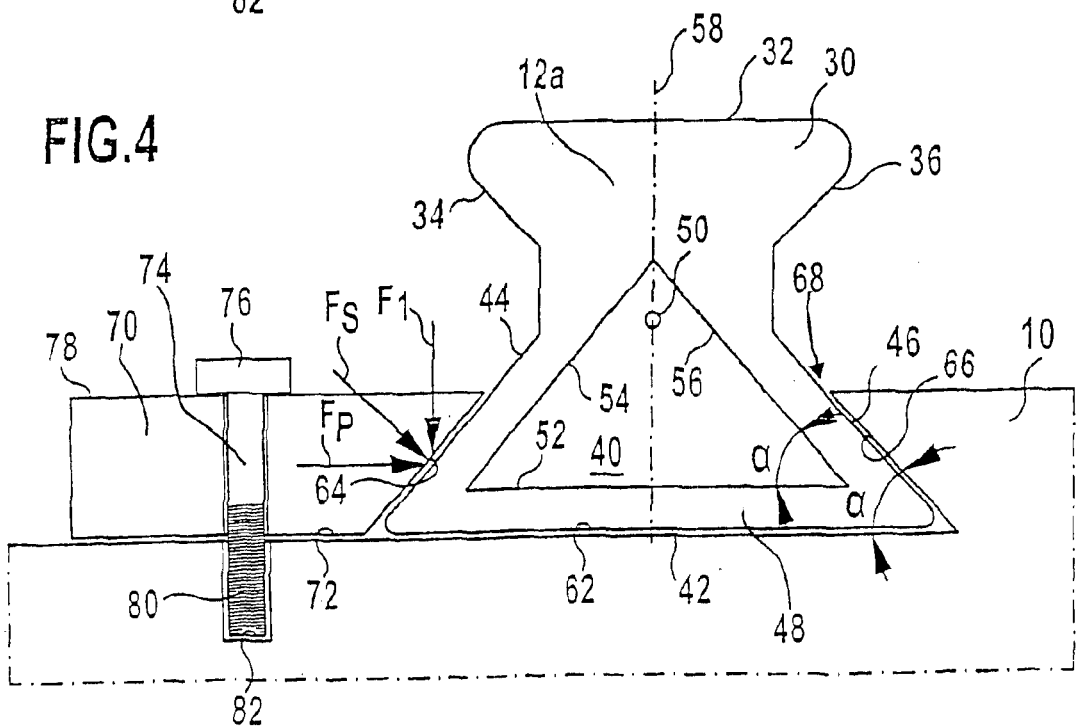
FIG. 4 shows an illustration similar to FIG. 2 of a second embodiment.

In a second embodiment of an inventive slide system, illustrated in FIG. 4, the aligning surface 66 is originally designed as a spherical surface. This spherical surface is deformed into an approximately flat surface due to the effect of the clamping force F1. In the ideal case, the aligning surface 66 abuts on the mounting surface 46 essentially over its entire surface under the full effect of the clamping force F1.

As a result, it is possible to take deformations of the material into consideration by shaping the aligning surfaces or also the mounting surfaces in such a manner that they then abut on one another essentially over their entire surfaces due to the effect of the clamping force.

In the same way, it is also possible, for example, to design the aligning surface 62 so as to be slightly curved, i.e., spherical.

What is claimed is:

1. Slide system for machine tools, comprising:
  a base member,
  at least one guide rail held on the base member and extending in a longitudinal direction,
  a slide guided on the guide rail with at least one guide carriage,
  the guide rail having a guiding area for guiding said slide, and a base area for providing a fixed connection to the base member,
  one of the base area and the base member having a receiving means extending transversely to the longitudinal direction of the guide rail and the other of the base area and the base member having an insert member insertable into the receiving means, said insert member being inserted into the receiving means in a direction transverse to the longitudinal direction of the guide rail,
  a clamping element for clamping the insert member in the receiving means, and
  the insert member being fixed in a form-locking manner by the receiving means and the clamping element in all directions extending transversely to the longitudinal direction.

2. Slide system as defined in claim 1, wherein:
  the receiving means has at least one aligning surface, and
  an associated mounting surface of the insert member abutting on said aligning surface.

3. Slide system as defined in claim 2, wherein:
  the receiving means has two aligning surfaces, and
  an associated mounting surface of the insert member abutting on each of said surfaces.

4. Slide system as defined in claim 3, wherein the two aligning surfaces are arranged in the receiving means so as to face one another.

5. Slide system as defined in claim 3, wherein:
  each aligning surface and the associated mounting surface of the insert member form a pair of surfaces, and
  at least one surface of each pair of surfaces comprises a flat surface.

6. Slide system as defined in claim 5, wherein the surfaces of different pairs of surfaces extend at an angle of less than 90° relative to one another.

7. Slide system as defined in claim 6, wherein the surfaces of different pairs of surfaces extend at an angle in the range of between 30° and 60° relative to one another.

8. Slide system as defined in claim 5, wherein the flat surfaces of the different pairs of surfaces extend relative to one another at an angle greater than a critical angle of the self-locking.

9. Slide system as defined in claim 2, wherein;
  the aligning surface and the associated mounting surface of the insert member form a pair of surfaces, and
  at least one surface of the pair of surfaces comprises a flat surface.

10. Slide system as defined in claim 9, wherein both surfaces of the pair of surfaces comprise flat surfaces.

11. Slide system as defined in claim 9, wherein one of the aligning surfaces comprises curved surface.

12. Slide system as defined in claim 9, wherein the pairs of surfaces are formed by surfaces sliding relative to one another.

13. Slide system as defined in claim 12, wherein the pairs of surfaces are each formed by ground surfaces.

14. Slide system as defined in claim 1, wherein the base area is symmetric to a longitudinal central plane of the guide rails.

15. Slide system as defined in claim 1, wherein the guiding area is symmetric to the longitudinal central plane of the guide rails.

16. Slide system as defined in claim 1, wherein the base area and the guiding area of the guide rails are part of an integral profiled rail extending in the longitudinal direction.

17. Slide system as defined in claim 16, wherein the profiled rail has an essentially constant cross-sectional shape in the longitudinal direction.

18. Slide system as defined in claim 1, wherein the clamping element constantly acts on the insert member with clamping forces.

19. Slide system as defined in claim 18, wherein at least one clamping element acts on the insert member with the clamping force at multiple locations over the length of the guide rail.

20. Slide system as defined in claim 19, wherein the at least one clamping elements is arranged without penetrating the guide rail.

21. Slide system as defined in claim 19, wherein the clamping forces are adjustable locally.

22. Slide system as defined in claim 18, wherein clamping forces acting on the insert member with the clamping element are adjustable.

23. Slide system as defined in claim 1, wherein the clamping element acts on the insert member from a side located opposite the receiving means.

24. Slide system as defined in claim 1, wherein the clamping element acts directly on the insert element.

25. Slide system as defined in claim 24, wherein the clamping element abuts areally on the insert member.

26. Slide system as defined in claim 1, wherein the clamping element comprises a clamping bar.

27. Slide system as defined in claim 1, wherein the clamping element acts on the insert member by means of at least one pressure surface.

28. Slide system as defined in claim 27, wherein the pressure surface extends over an extension of the clamping element in its longitudinal direction.

29. Slide system as defined in claim 1, wherein the clamping element is provided with pressure surfaces on oppositely located longitudinal sides for acting upon a respective insert member.

30. Slide system as defined in claim 29, wherein the pressure surfaces of the clamping element act upon insert members of different, adjacent guide rails.

31. Slide system as defined in claim 1, wherein:
the base area of the guide rail comprises an insert member, and
the base member comprises the receiving means.

32. Slide system as defined in claim 31, wherein:
the base area has at least three mounting surfaces extending parallel to the longitudinal direction of the guide rail,
each of said mounting surfaces extending in a direction transverse to the longitudinal direction and parallel to a different, respective side of a triangle located in a plane extending transversely to the longitudinal direction.

33. Slide system as defined in claim 32, wherein one of the mounting surfaces extends on a side of the base area located opposite the guiding area.

34. Slide system as defined in claim 33, wherein:
two of the three mounting surfaces are arranged on the base area and extend on different sides of the mounting surface located opposite the guiding area.

35. Slide system as defined in claim 32, wherein the triangle comprises an isosceles triangle.

* * * * *